(12) United States Patent
Akerman et al.

(10) Patent No.: US 6,525,729 B1
(45) Date of Patent: Feb. 25, 2003

(54) RAYCASTING SYSTEM AND METHOD

(75) Inventors: Shmuel Akerman, Binyamina (IL); Gad Miller, Kfar-Yedidia (IL)

(73) Assignee: Algotec Systems Ltd., Raanana (IL)

( * ) Notice: Subject to any disclaimer, the term of this patent is extended or adjusted under 35 U.S.C. 154(b) by 0 days.

(21) Appl. No.: 09/622,732
(22) PCT Filed: Feb. 18, 1999
(86) PCT No.: PCT/IL99/00105
§ 371 (c)(1), (2), (4) Date: Aug. 21, 2000
(87) PCT Pub. No.: WO99/42955
PCT Pub. Date: Aug. 26, 1999

Related U.S. Application Data
(60) Provisional application No. 60/075,519, filed on Feb. 23, 1998.

(51) Int. Cl.$^7$ .............................................. G06T 17/00
(52) U.S. Cl. ...................... 345/426; 345/422; 345/424
(58) Field of Search ................................ 345/418, 419, 345/420, 421, 422, 423, 424, 426, 427

(56) References Cited

U.S. PATENT DOCUMENTS

| | | | |
|---|---|---|---|
| 5,113,357 A | * | 5/1992 | Johnson et al. ............. 345/424 |
| 5,458,111 A | | 10/1995 | Coin |
| 5,611,025 A | | 3/1997 | Lorensen et al. |
| 5,959,631 A | * | 9/1999 | Knittel ........................ 345/420 |
| 6,313,841 B1 | * | 11/2001 | Ogata et al. ................. 345/424 |

FOREIGN PATENT DOCUMENTS

WO  WO 93/00650  1/1993

OTHER PUBLICATIONS

Levoy, M.; "Volume Rendering by Adaptive Refinement"; Visual Computer; 1990; West Germany; vol. 6; No. 1; pp. 2–7; XP002106780; ISSN 0178–2789.

Pfister H. et al.; "Gradient Estimation and Sheared Interpolation for The Cube Architecture"; Computers and Graphics; vol. 19; No. 5; Sep. 1, 1995; pp. 667–677; XP000546651.

Carr, J. et al.; "Surface Interpolation with Radial Basis Function for Medical Imaging"; IEEE Transactions on Medical Imaging; vol. 16; No. 1; Feb. 1997; pp. 96–107; XP000685494.

Foley, J. et al.; "Computer Graphics Principles and Practice, Second Edition in C"; Addison–Wesly Publishing Company; Chapters 5–6 and 15–16; pp. 201–227, 229–283 and 649–734; 1996.

* cited by examiner

*Primary Examiner*—Cliff N. Vo
(74) *Attorney, Agent, or Firm*—Fenster & Company Patent Attorneys Ltd.

(57) ABSTRACT

A method of determining a z-buffer for a voxel data set, comprising first raycasting at least a first ray to determine a value for a first z-buffer element; and second raycasting at least a second ray to determine a value for a second z-buffer element, where said z-buffer element values are determined at different accuracies, which different accuracies are responsive to characteristics of the data set at a neighborhood of said rays. Preferably, said different accuracies are achieved by modifying the accuracy of determination of an intersection between a cast ray and a solid voxel of said data set. Alternatively or additionally, said different accuracies are achieved by modifying the density of raycasting into the z-buffer.

48 Claims, 4 Drawing Sheets

ND METHOD

RAYCASTING SYSTEM AND METHOD

RELATED APPLICATIONS

The present application claims the benefit under 119(e) from U.S. provisional patent application No. 60/075,519, with a like title and filed on Feb. 23, 1998, the disclosure of which is incorporated herein by reference.

FIELD OF THE INVENTION

The present invention relates to the display of three-dimensional image data sets, and in particular to raycasting.

BACKGROUND OF THE INVENTION

Volumetric data sets are usually viewed by being projected unto a two dimensional surface. Two main types of projection systems are used: an orthographic projection, and a perspective projection. In a perspective projection, a single viewpoint is assumed, from which rays emanate and strike the surface. In an orthographic projection, these rays are all perpendicular to a common plane.

Some methods of rendering a volumetric data set onto a two dimensional surface utilize a z-buffer. The values in the z-buffer are equal to the length of rays from the projection point (plane) to the surface. One method of generating the z-buffer, namely raycasting, is applied by following a plurality of rays from their source (point or plane) until they terminate at a solid voxel. Once a z-buffer is generated, the voxels are projected unto the z-buffer and lighting calculations are made, using well known methods, such as described in "Computer Graphics Principles and Practice, Second Edition in C", by James D. Foley, et al., Addison-Wesly, 1996, the disclosure of which is incorporated herein by reference.

The data set is typically a binary data set, at least for the purposes of raycasting. The value of each voxel is generally assumed to be a discrete sample of a continues spatial function at the center of that voxel. Thus, it is necessary to perform some type of interpolation to determine whether the ray is passing through a transparent voxel or has reached a boundary voxel. Unfortunately, high quality interpolations are generally slow. In addition, some high quality interpolations are not smooth. For example, a long series of values ... 010101010 ... will usually not be interpolated as a fixed value 0.5. Generally, some of the waviness of the data will remain after the interpolation, resulting in a wavy interpolation. This is in conflict with the general desire that the z-buffer should not contain frequencies of the order of one over a voxel dimension, because these frequencies are mainly artifacts caused by the limited spatial sampling of the volume.

Cubic interpolations are generally determined using four data points and four constraints. Two sets of constraints, known in the art are:

(1) $y(x_n)=y_n$; for n=1 ... 4, where $x_n$ and $y_n$ are known and where x is between $x_2$ and $x_3$; and (2) $y(x_2)=y_2$, $y(x_3)=y_3$, $y'(x_2)=(y_3-y_1)/(x_3-x_1)$ and $y'(x_3)=(y_4-y_2)/(x_4-x_2)$

SUMMARY OF THE INVENTION

It is an object of some embodiments of the present invention to provide a method of ray-casting a voxel data set in which only a required accuracy of values for elements in a z-buffer is achieved. Preferably, the required accuracy is locally determined based on variations in the voxel data set. In one preferred embodiment of the invention, a reduced accuracy of determination of intersections between rays and solid voxels, i.e. the length of the rays, is allowed. Alternatively or additionally, reduced spatial resolution of the z-buffer is allowed, resulting in a less accurate value for the true distance between individual solid voxels and the view origin. Alternatively or additionally, a less accurate interpolation of data is allowed.

It is an object of some embodiments of the present invention, to provide a fast method of cubic interpolation, which is especially suitable for raycasting, but is also useful for other applications, especially those requiring smoothing of data.

It is an object of some preferred embodiments of the present invention, to provide a method of raycasting, in which the spacing of the rays is dependent on a surface variation of the voxel data. In a preferred embodiment of the invention, the method is applied to an image having a plurality of areas having low-contrast features, separated by sharp boundaries. Such images are typical of some types of medical images, where the act of segmentation creates sharp boundaries. Preferably, the spacing of the rays is decreased at the sharp boundaries and increased at the low-detail areas, thereby being adapted to the required accuracy of raycasting.

It is an object of some preferred embodiments of the present invention, to provide a method of raycasting in which the accuracy of determining the length of each ray is dependent on the surface variation.

It is another object of some preferred embodiments of the present invention to provide a method of raycasting, in which the length of a ray is iteratively determined.

It is another object of some preferred embodiments of the present invention to provide a method of raycasting, wherein the type of data interpolation used is adapted to the instant accuracy at which the ray is cast.

It is an object of some preferred embodiments of the invention, to provide a method of cubic interpolation which smoothes out the data, e.g., it smoothes a sequence such as ... 0101010101010 ..., without leaving a residual ripple.

In accordance with a preferred embodiment of the present invention, a method of raycasting comprises casting rays in multiple spacing resolutions, starting at a coarse (large) spacing. Rays are added between rays of a previous step, depending on the gradient of data in the z-buffer. If the gradient is small, the z-buffer value is determined by interpolation, rather than by casting a new ray. In a preferred embodiment of the invention, the large spacing casting is applied to a reduced-resolution version of the data set, preferably into a low resolution z-buffer. Preferably, previously cast rays are re-cast, when the resolution of the z-buffer is increased. Preferably, the previously determined z-values are used as a starting point for the search for the solid voxel boundary-ray intersection location, in the finer spacing. Alternatively the raycasting is applied to the fill resolution data set, even in the coarser spacing levels, so that the determined intersection location has a maximal accuracy. Preferably the coarsest spacing level is selected responsive to a statistical property of the data set.

In some preferred embodiments of the invention, externally provided information is used to determine the spacing of the cast rays, at the start of the casting and/or at the end of the casting and/or locally. In one preferred embodiment of the invention, information regarding the clinical interest of a portion of the data is available. Areas which are of more clinical interest are preferably ray cast with a smaller initial inter-ray spacing and/or a lower gradient threshold. In one preferred embodiment of the invention, areas of clinical interest are automatically identified by registering the data set with a previously interpreted data set in which areas of interest are indicated.

In a preferred embodiment of the invention, the inter-ray spacing and/or the gradient threshold and/or other factors which affect the accuracy of the raycasting are dependent on the ray length and/or on the angle between the ray and the voxel surface and/or on the relative location of the ray in the field of view. Preferably, a highest image quality is desired for voxels which are nearer the center of the field of view and within a certain range of distances from the viewing origin. Preferably, this higher image quality is attained by increasing the accuracy of determination of the z-buffer for these voxels. In a preferred embodiment of the invention, a user may enter parameters which define the required accuracy and/or relative image quality for voxels at different distances, angles and/or surface angles.

In accordance with a preferred embodiment of the present invention, additionally or alternatively to coarse ray-spacing, a reduced accuracy of ray length determination is allowed. In a preferred embodiment of the invention, the intersection between the ray and a voxel is searched for, other than by sequentially tracing along the ray. In one preferred embodiment of the invention, a suspected intersection between a ray and a voxel is determined using a reduced resolution data set, i.e., using a different granularity. Thereafter, a higher resolution data set is used to pin-point and/or remove the suspected intersection from consideration. Preferably, the process advances by increasing the resolution and determining, in the increased resolution data set, whether the front of the ray is beyond or in front of a solid voxel. Alternatively or additionally to modifying the resolution of the data set, other methods of modifying the accuracy of the intersection determination may be used, for example, the step size at which the ray is examined for intersections.

In accordance with a preferred embodiment of the invention, the type and/or quality of the interpolation used to determine an intersection between a voxel and a ray, is related to the accuracy at which the intersection is being determined. Higher quality (and slower) interpolations are used when the accuracy is high.

In accordance with a preferred embodiment of the invention, a novel cubic interpolation method is provided. One aspect of an interpolation method, in accordance with some preferred embodiments of the invention, is that it combines smoothing with interpolation. Preferably, the interpolation is determined by a number of constraints and different amounts of smoothing are effected by different constraints. In a preferred embodiment of the invention, at least some of the constraints are not smoothing constraints. Another aspect of an interpolation method, in accordance with some preferred embodiments of the invention, is that the interpolation is not constrained to pass through the points which are used for interpolation.

In accordance with a preferred embodiment of the invention, the interpolation is smoother than standard cubic interpolation. One advantage of a smooth interpolation relates to the method of data packing typically used for voxel data. Typically, more than one voxel is packed into a single machine word. In particular, when a bit volume is used to represent solid voxels, only a single bit is used for each voxel. Most computers have a computational difficulty with handling data which is not stored as a multiple of a byte or word size, especially when the data is stored as fractions of bytes. By performing smoothing as part of interpolation, significant amounts of memory and computations may be saved, especially with regard to unpacking data and storing such data after smoothing in an unpacked data array. It should be appreciated that in some preferred embodiments of the invention, interpolation with smoothing requires the same number of computational steps as does interpolation without smoothing.

In a preferred embodiment of the invention, the original data is never smoothed, so that it can be stored in a more memory efficient manner.

In a preferred embodiment of the invention, a three-dimensional approximation is applied as a plurality of one dimensional approximations. In a first step, a voxel cube of extent 4×4×4 is reduced to an interpolated voxel square of extent 4×4, by 16 parallel one-dimensional interpolations. The square is reduced to a (double interpolated) line of voxels, by 4 one-dimensional interpolations. The line is reduced to a (triple) approximated voxel by a single application of a one-dimensional interpolation. In some preferred embodiments of the invention, fewer or additional voxels may be utilized for the interpolation, in order to affect the quality of the interpolation.

There is therefore provided in accordance with a preferred embodiment of the invention, a method of determining a z-buffer for a voxel data set, comprising:

first raycasting at least a first ray to determine a value for a first z-buffer element; and second raycasting at least a second ray to determine a value for a second z-buffer element, wherein said z-buffer element values are determined at different accuracies, which different accuracies are responsive to characteristics of the data set at a neighborhood of said rays.

Preferably, said different accuracies are achieved by modifying the accuracy of determination of an intersection between a cast ray and a solid voxel of said data set.

In a preferred embodiment of the invention, determining an intersection comprises first performing a low accuracy determination and then performing at least one higher accuracy determination of said intersection, responsive to said first determination.

Additionally or alternatively, modifying the accuracy comprises using different interpolation methods to achieve different accuracies. Alternatively or additionally, said intersection is determined by advancing along a ray and modifying the accuracy comprises modifying a step size of said advance. Alternatively or additionally, modifying said accuracy comprises modifying a granularity of said data set for performing said intersection determination. Alternatively or additionally, said accuracy is determined responsive to a distance of said intersection from an origin of the ray. Alternatively or additionally, said accuracy is determined responsive to a length of time for the intersection determination.

In a preferred embodiment of the invention, said at least first ray comprises a first plurality of rays. Alternatively or additionally, said at least second ray comprises a second plurality of rays.

In a preferred embodiment of the invention, said different accuracies are achieved by raycasting into the z-buffer at the vicinity of the first element and of the second element, with different ray densities. Preferably, the method comprises determining a value of a characteristic at a z-buffer element and casting a ray at the z-buffer element only if the value is above a predetermined threshold.

Preferably, said characteristic is a gradient. Alternatively or additionally, said raycasting comprises first casting a first plurality of rays and said second raycasting comprises raycasting a second plurality of rays, and said second plurality of rays increases the density of rays cast into said z-buffer.

Preferably, said second plurality of rays are cast between rays of said first plurality of rays. Alternatively or additionally, the threshold value is dependent on the number of raycastings performed into the z-buffer. Alternatively or additionally, said estimation uses an estimation method which is determined responsive to the number of raycastings performed into the z-buffer.

There is also provided in accordance with a preferred embodiment of the invention a method of determining a z-buffer for a voxel data set, comprising:

determining an intersection between a cast ray and a solid voxel of said data set, at a first accuracy; and determining said intersection at at least a second, higher accuracy, responsive to said first determination.

Preferably, said determining at a lower resolution comprises advancing along a ray in steps and performing a determination whether a current position is inside or outside a solid voxel. Preferably, the method comprises determining a direction of advancing along a ray towards an intersection responsive to whether a current position along a ray is inside or outside a solid voxel. Alternatively or additionally the method comprises retracing at least a portion of a step along the ray, between said determining at a lower accuracy level and determining at a higher accuracy level.

In a preferred embodiment of the invention, the method comprises decreasing the accuracy of determination responsive to the amount of time spent at an accuracy level. Alternatively or additionally, the accuracy is at least partially determined by a step size of advancing along a cast ray. alternatively or additionally, the accuracy is at least partially determined by a granularity of the voxel data set. Alternatively or additionally, the accuracy is at least partially determined by a quality of interpolation of a voxel value.

There is also provided in accordance with a preferred embodiment of the invention, a method of interpolation comprising:

providing a data set; and applying a smoothing interpolation to said data set.

Preferably, the data set is a bit volume, in which each voxel is packed so as to be represented by less than a byte. Preferably, each voxel is represented by a single bit. Alternatively or additionally, the voxels are not unpacked for said smoothing interpolation.

In a preferred embodiment of the invention, the interpolation is a cubic interpolation. Alternatively or additionally, said interpolation requires an equal amount of steps as an interpolation which is of the same order but which does not perform smoothing. Alternatively, said smoothing interpolation requires fewer steps than smoothing and applying an interpolation which is of the same order but which does not perform smoothing.

In accordance with a preferred embodiment of the invention, said interpolation uses at least two points which straddle a point to be interpolated and said interpolation is not constrained to pass through at least one of the points which is adjacent said point to be interpolated. Preferably, said interpolation uses four points and wherein said interpolation is not constrained to pass through the two points which are adjacent to said point to be interpolated.

In a preferred embodiment of the invention, the method comprises determining said smoothing interpolation, based on a plurality of constraints. Preferably, said plurality of constraints comprises at least one smoothing constraint. Preferably, said plurality of constraints comprises at least two smoothing constraints. Preferably, said at least two constraints comprise at least one constraint on a value of the interpolation. Alternatively or additionally, said at least two constraints comprise at least one constraint on a derivative of said interpolation.

In a preferred embodiment of the invention, not all of said constraints utilize a same smoothing. Preferably, at least one of said constraints does not induce any smoothing.

In a preferred embodiment of the invention, the method comprises utilizing said smoothed interpolated value to determine an intersection between a cast ray and a solid voxel. Alternatively or additionally, the smoothing interpolation meets the following constraints, where $y_1$, $y_2$, $y_3$ and $y_4$ are values of points in the data set at points $x_1$, $x_2$, $x_3$ and $x_4$, respectively and where $x_1<x_2<x<x_3<x_4$:

$$y(x_2) = \frac{y_1 + 2y_2 + y_3}{4}$$

$$y(x_3) = \frac{y_2 + 2y_3 + y_4}{4}$$

Alternatively or additionally, the smoothing interpolation meets the following constraints, where $y_1$, $y_2$, $y_3$ and $y_4$ are values of points in the data set at points $x_1$, $x_2$, $x_3$ and $x_4$, respectively and where $x_1<x_2<x<x_3<x_4$:

$$y'(x_2) = \frac{y_3 - y_1}{x_3 - x_1}$$

$$y'(x_3) = \frac{y_4 - y_2}{x_4 - x_2}$$

Alternatively or additionally, said smoothing interpolation generates an interpolated value 0.5 for runs of values ... 0, 1, 0, 1, 0, 1, 0, 1 . . . , the value 0 for runs of zeros and the value 1 for runs of ones.

Alternatively or additionally, the derivative of the smoothing interpolation is continuous.

There is also provided in accordance with a preferred embodiment of the invention, a method of determining a z-buffer for a voxel data set, comprising:

adding a plurality of additional solid voxels to said data set;

casting at least one ray to the voxel dataset, in the direction of at least one of said additional voxels;

determining an intersection between said ray and a solid voxel of said dataset; and determining if said solid voxel at said intersection is one of said additional voxels.

Preferably, said additional solid voxels enclose said voxel data set.

In a preferred embodiment of the invention, as described hereinabove, the data set is a medical data set.

BRIEF DESCRIPTION OF THE DRAWINGS

The present invention will be more clearly understood from the following detailed description of the preferred embodiments of the invention and from the attached drawings, in which.

DETAILED DESCRIPTION OF THE PREFERRED EMBODIMENTS

Figure 1A:
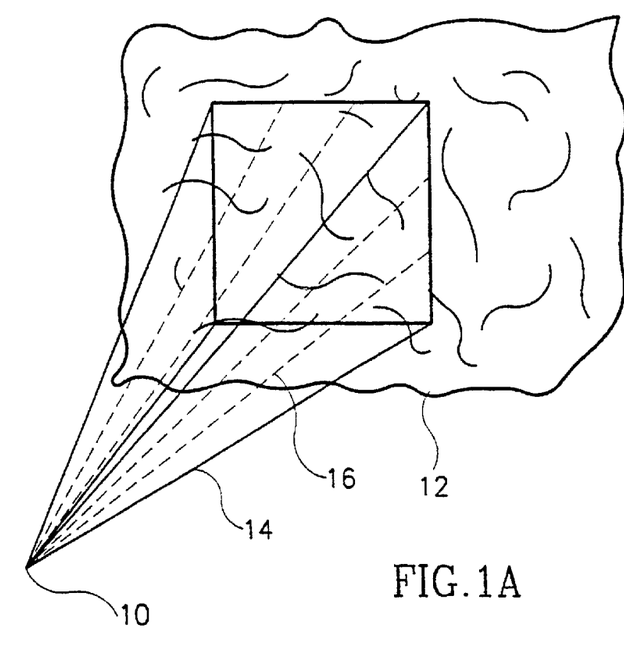
FIG. 1A is a schematic illustration of raycasting from a point.
Figure 1B:
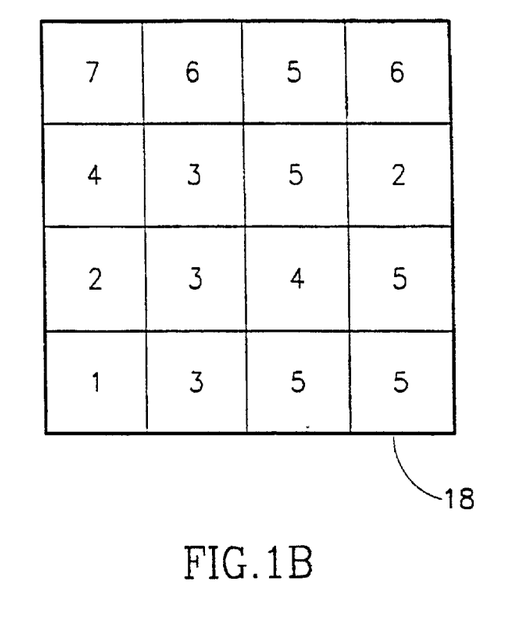
FIG. 1B is a schematic illustration of a z-buffer created by the raycasting of FIG. 1A.

FIG. 1A is a schematic illustration of raycasting from a point 10, through a viewport 14. A plurality of rays 16 are cast towards a surface 12 which is defined by a dataset. FIG. 1B is a schematic illustration of a z-buffer 18 created by the raycasting of FIG. 1A.

Figure 2:
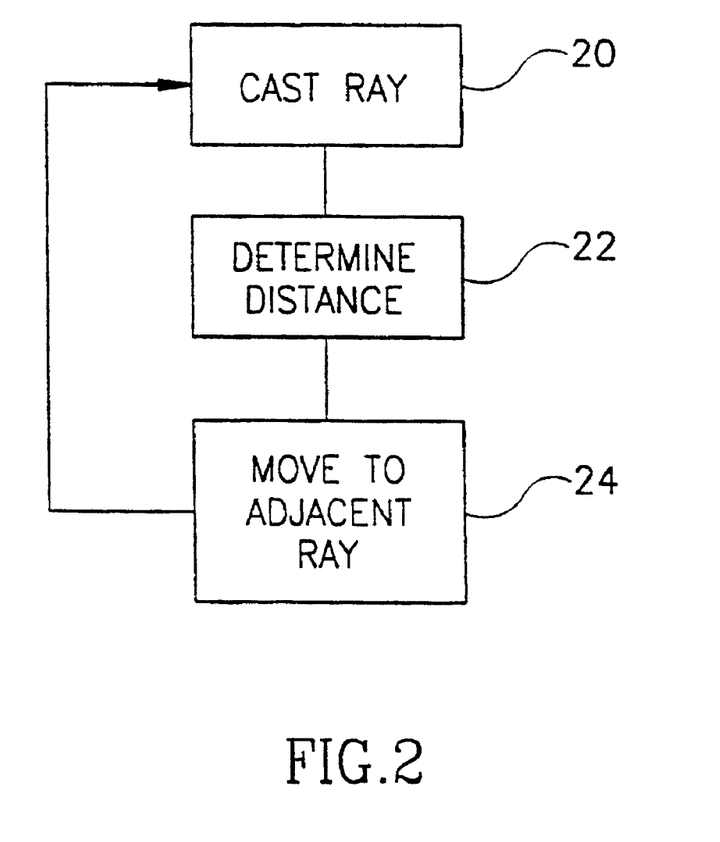
FIG. 2 is a flowchart of a method of raycasting, in accordance with a preferred embodiment of the invention.

FIG. 2 is a flowchart of a method of raycasting, in accordance with a preferred embodiment of the invention. A ray 16 is cast (20). The distance between the ray and the nearest surface (the ray length) is determined (22) and entered into z-buffer 18. The process is repeated for a plurality of rays (24).

Figure 3:
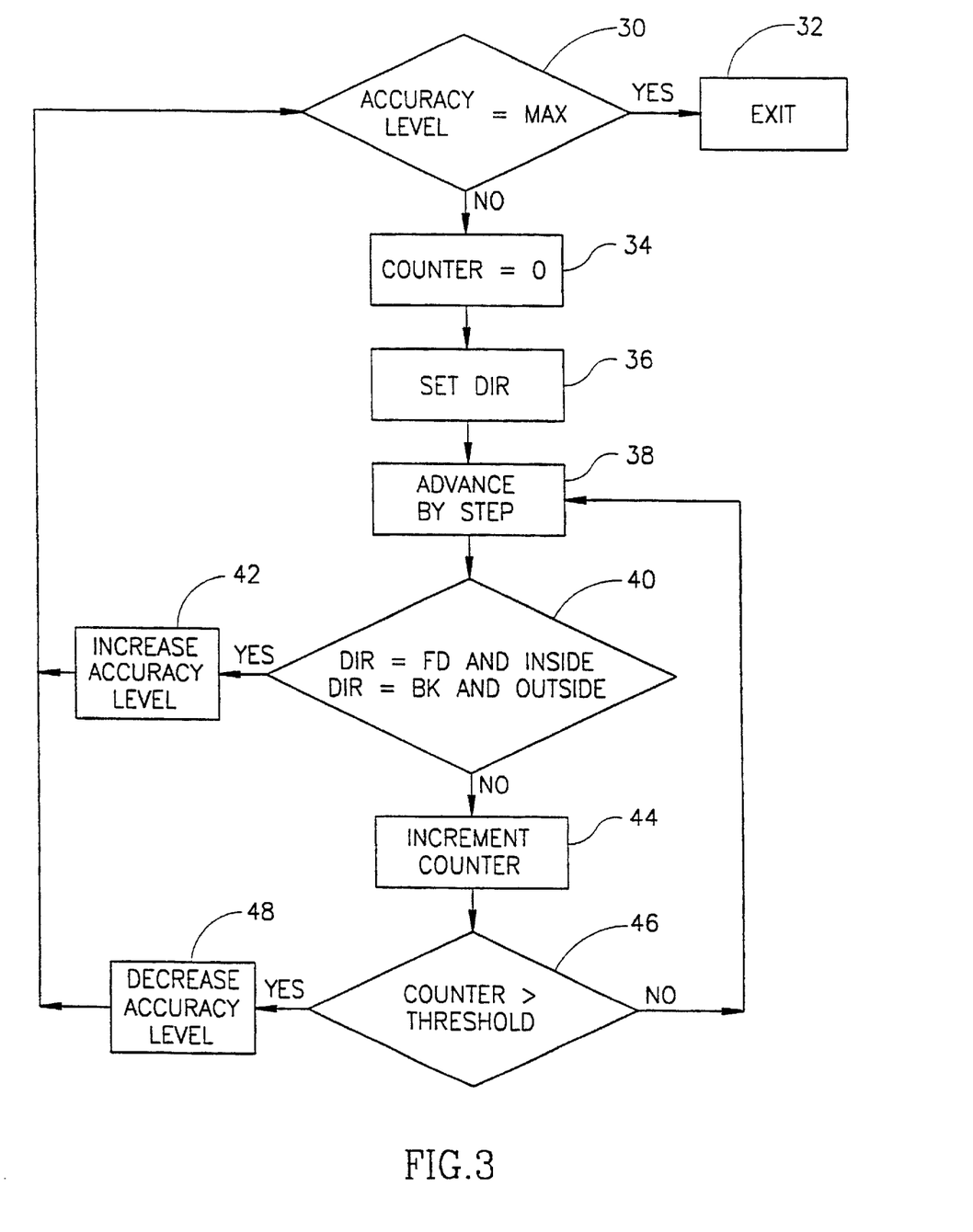
FIG. 3 is a flowchart of a method of ray length determination, in accordance with a preferred embodiment of the invention.

One aspect of some embodiments of the present invention relates to reducing the computational complexity of casting rays. FIG. 3 is a flowchart of a method of length determination, in accordance with a preferred embodiment of the invention. In the method of FIG. 3, the ray is cast with an increasing accuracy, to zero in on an intersection between a solid voxel and the cast ray. Preferably, if the intersection is not found at a higher accuracy level, e.g., it does not really exist, the accuracy level is reduced and the search for an intersection is continued utilizing the lower accuracy level. In a preferred embodiment of the invention, information regarding the data set is used to further reduce the computation time. For example, if a minimum distance between point 10 and the closest solid voxels of surface 12 is known, this is a lower bound on the length for any ray.

The method, as described in FIG. 3, is a state machine, which exits with the current position along a cast ray, once an intersection is found in the highest accuracy level (30). In a preferred embodiment of the invention, the highest accuracy level used is determined responsive to the length of the ray. Thus, far intersections are preferably determined with a lower precision than nearer intersections, since accuracy in determining far intersections affects the image quality to a lesser degree than closer intersections. In a preferred embodiment of the invention, the voxel data set (or portion of interest thereof) is surrounded with a fake border of solid voxels. When an intersection is determined, a check is made to see if the intersection is real or if it is caused by the cast ray exiting the voxel data set and intersecting with one of the "fake" voxels. Additionally or alternatively to the fake voxels enclosing the voxel data set, the fake voxels may be inserted into the voxel data set, for example, to enclose and/or to mask portions of the voxels data set. Preferably, the positions of the fake voxels satisfy mathematical relationship, so that it is simple to determine if a voxel, at a certain position, is a fake voxel. Alternatively, the fake voxels can be detected by matching against a special bit volume. It should be appreciated that due to the interpolation, a voxel position may be off by a small number of voxels, so that when a fake voxel is located close to a real voxel, the determination of the type of voxel/intersection is preferably made at a higher accuracy level. Preferably, the determination whether a current position is inside a real solid voxel or inside a fake solid voxels is a majority decision based on the number of neighboring voxels of each type.

In a preferred embodiment of the invention, a counter is set to zero (34), so that it is possible to limit the amount of time spent at high accuracy levels. The direction of advance along the ray is set to be either forward or backwards, depending on whether the current position is inside a solid voxel or outside one (38). Since a position along the ray is rarely exactly at a voxel center, the decision, as to whether a position is inside a solid voxel or outside of one, is usually based on an interpolation between neighboring voxels. Generally, if the value of the interpolation is over a certain threshold value, such as 0.5, the position is considered to be "inside"; otherwise, it is "outside". Preferably, if the position is inside (outside), the direction is set to be backwards (forwards).

The position is then advanced in the selected direction along the cast ray by a step (38). Preferably, the step size is smaller than a voxel at the current resolution, to avoid missing intersections. However, the maximum step size may depend on the interpolation scheme used. For example, if the interpolation scheme decides "inside" if any of the neighboring voxels (26 for parallelepiped voxels) is solid, the step size may be made larger than one voxel. In a preferred embodiment of the invention, the dataset is resampled and/or interpolated to the required resolution and/or step size. Alternatively, the voxel values are calculated on the fly from the original data set.

If the direction is forward and the current position is "inside" or if the direction is backwards and the current position is "outside", then a more thorough check of the locality of the position is preferably made to determine if there is an intersection between the ray and a solid voxel (40). The accuracy level is increased (42) and the process is repeated at this higher accuracy level (30). Preferably, a the current position is retraced one step prior to increasing the accuracy level. If the accuracy level is not increased, the process is continued by advancing another step (38) at the same accuracy level. Optionally, a counter is used to keep track of the number of steps performed in each accuracy level. If too many steps are required, it is usually desirable to return to a lower accuracy level, at which intersection determination is faster. Thus, the counter is incremented (44). If the counter is above a threshold (46), then the accuracy level is decreased (48) and the process is repeated at this lower accuracy level (30). Otherwise, the process is continued by advancing a step at the current accuracy level (38).

In accordance with a preferred embodiment of the invention, the step size (as a percentage of the voxel size at the current resolution) is a function of the accuracy level. For example, at a low accuracy level the step size might be one half the voxel size for that level, while at a higher accuracy level the step size might be one-tenth the voxel size. In some preferred embodiments of the invention, different accuracy levels also have different voxel sizes. Alternatively or additionally, the step size is a function of the distance from the view origin. Preferably, when the cast ray is further from the origin, the step is larger.

In a preferred embodiment of the invention, the step size is selected so that the accuracy of the gradient determination is substantially constant for all the rays. It should be appreciated that the gradient is a function of the ratio between the lengths of the rays (shown further below). Thus, for voxels which are double the distance from the origin as compared to other voxels, only half the ray-length accuracy is required, so that this ratio is determined with a constant precision.

Another aspect of some embodiments of the present invention relates to reducing the complexity of interpolation, responsive to the instant accuracy of the raycasting. Preferably, the quality and/or complexity of the interpolation is related to the accuracy level. Preferably, higher accuracy levels use higher quality interpolation schemes than lower accuracy levels. Preferably, the raycasting method is optimized so that roughly equal amounts of time are spent at each accuracy level. Generally, since fewer interpolations are performed at the higher accuracy levels, slower interpolation schemes can be afforded than at the lower accuracy levels. Slower schemes include those which have fewer artifacts, are smoother and/or are slower. In accordance with a preferred embodiment of the invention, the following three interpolation schemes are used:

(a) nearest neighbor;
(b) linear interpolation; and
(c) cubic interpolation.

In other preferred embodiments of the invention, other interpolation methods may be used in addition to- or instead of- the above methods. In addition, the (computational) complexity of an interpolation scheme can also be affected by using integer, fixed point and/or various precision floating point representations. Alternatively or additionally, parametric interpolation schemes may be used. For example, nearest neighbor interpolation can look only at 6 or 18 neighbors rather than at 26, i.e. neighbors with shared facets, lines or vertexes. Linear interpolation can be one, two or three dimensional and may also be used with different numbers of neighbors.

In a preferred embodiment of the invention, a hierarchy of interpolation methods is set up to always err in the same direction. In one example, the interpolation methods err on the side of providing false positives, which mean extra computations, rather than false negatives, which might mean a missed intersection. For example, instead of a simple nearest neighbor, a voxel may be considered solid if any of its adjacent neighbors are solid. In a preferred embodiment of the invention, when a lower resolution data set is being generated, a voxel is assigned a value "1" (solid) even if only a single one of its constituent voxels is solid. Thus, even a single layer of solid voxels (in a high resolution data set) will still act as a boundary (when viewed as a low resolution data set). Alternatively, a different threshold number of solid neighboring voxels other than one may be used.

In a preferred embodiment of the invention, the interpolations used are also set up to err in a progressive manner with regard to the position of the intersection along the ray. Thus, if the low quality interpolation indicates that there is an intersection at a position A, the next higher quality interpolation indicates that the intersection is at point B and the third higher quality interpolation indicates that the intersection is at point C, then A, B and C will be in a linear order.

In a preferred embodiment of the invention, the count (used to decide on changing accuracy levels) is decided based on the type of interpolation used for the data at each accuracy level. In one example, such a decision may be based on the statistical probability of an intersection being determined at one location, using a first interpolation type for a first accuracy level and not being real or being offset along the ray, using a second interpolation type, for a second accuracy level. Additionally or alternatively, such a decision may be based on the effect of changing the step size and/or data set resolution between accuracy levels. Alternatively or additionally, the count may be based on an expected amount of offset of the intersection location, when changing accuracy levels.

As used herein regarding the method of intersection finding, an accuracy level may be determined by many factors, preferably by one or more of: the resolution of the dataset (voxel size and/or shape), the step size, the interpolation type and/or quality, the precision of arithmetic operations. In some preferred embodiments of the invention, the quality of an interpolation may be related to the number of neighbors used for the interpolation. Preferably, when the accuracy level is increased or decreased by one level, only one of the above factors will be changed, for example, only the step size or only the voxels dataset size. Preferably, increases in dataset resolution and step size are by multiples of two, however other multiplication factors, preferably based on statistical analysis, may be used.

Figure 4:
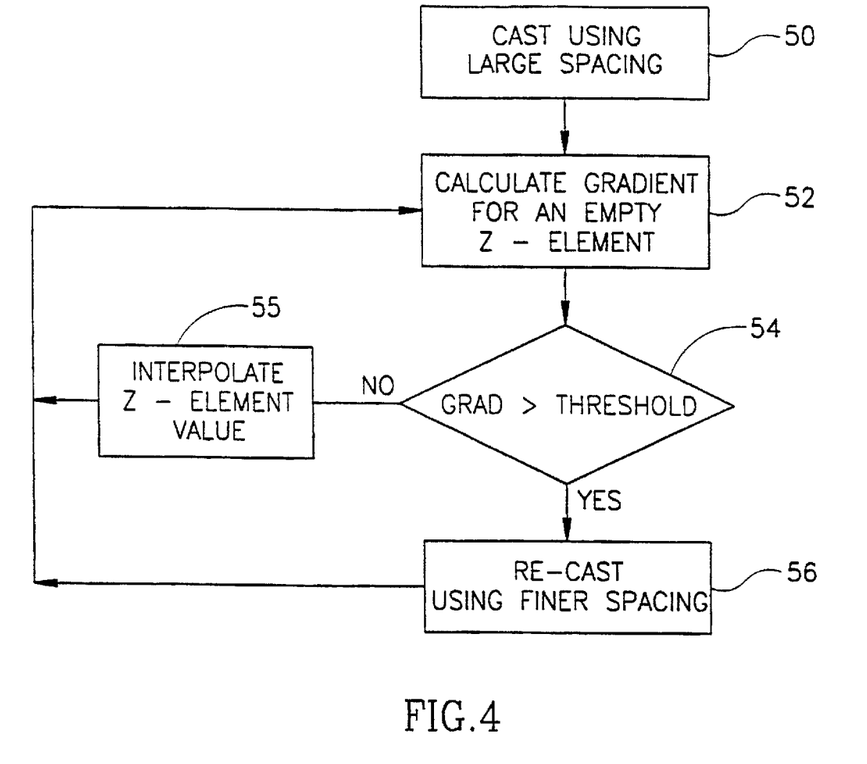
FIG. 4 is a flowchart of a method of reducing the number of cast rays, in accordance with a preferred embodiment of the invention.

Another aspect of some embodiments of the present invention relates to reducing the number of cast rays. FIG. 4 is a flowchart of a method of reducing the number of cast rays, in accordance with a preferred embodiment of the invention. Instead of acquiring the entire z-buffer at a single spatial resolution, the resolution is preferably adapted to the variance in each part of the z-buffer. Thus, portions of the z-buffer which have a low variance are acquired using fewer raycastings. In accordance with a preferred embodiment of the invention, the entire Z-buffer is ray-cast using a large inter-ray spacing (50). The entire z-buffer is then examined at a higher spatial resolution, preferably double the raycasting spatial resolution, so that three times as many z-buffer elements are examined as were ray-cast. For each empty z-element in the higher resolution, i.e., no ray was cast to it, the gradient is estimated from the z-values of its neighbors (52). For each element, if its gradient is above some predetermined threshold (54), it is re-cast (56). Otherwise, it is estimated by interpolation between its neighbors (55). The process is then preferably repeated until either all the z-elements have a gradient below the threshold or a maximum desirable raycasting resolution is achieved for all those z-elements with the high gradient.

In a preferred embodiment of the invention, the recasting is performed using a higher accuracy than in previous casting steps.

In one preferred embodiment of the invention, the density of ray-casting and z-buffer examination is even over the entire z-buffer. Alternatively, different portions of the z-buffer, such as those which have more clinical interest and/or have slower motion in the final field of view have a higher density of examination and/or ray-casting. Preferably, the inter-ray spacings for each pass are chosen so that three passes are required to examine every element in the z-buffer, however, other numbers of passes may also be used.

In accordance with a preferred embodiment of the invention, the entire z-buffer is repeatedly ray-cast. Alternatively or additionally, each portion of the z-buffer is ray-cast, until a desired spatial resolution and/or z-element value accuracy is achieved. In a preferred embodiment of the invention, the ray-casting is started at a portion of the z-buffer. Subsequently, rays are cast surrounding this portion, at a distance estimated by extrapolation and/or interpolation of previously ray-cast portions of the buffer. Preferably, a portion of the z-buffer is ray-cast, if the local gradient is larger than a predetermined amount. As with interpolation of voxels values, in some preferred embodiments of the invention, different methods are used to estimate gradients at different stages. In a preferred embodiment of the invention, the quality of the estimation is dependent on the spacing of the ray-casting, i.e., on the instant accuracy of the acquisition of the z-buffer. Alternatively or additionally, the number of neighboring z-buffer used for estimation may also be varied, for example, using only 2, 4 or all 8 neighbors. In different passes, different neighbors may be used for the estimation. In addition, the estimation may be varied by making the estimation bi-linear or bi-cubic. Alternatively, the local gradient may be extrapolated from the neighbors on one side of the z-buffer element.

In a preferred embodiment of the invention, the voxel data set is ray-cast at different voxel sizes, at different raycasting steps, so that different resolution z-buffers, representing different inter-ray spacings of z-buffer elements, are acquired.

As can be appreciated, the above described methods may be applied to portions of the z-buffer and/or portions of the dataset. Preferably, portions of the dataset which are further from the viewing origin are cast at lower resolutions.

In a preferred embodiment of the invention, the same gradient threshold is used for all the passes on the z-buffer. Alternatively, a different gradient is used for different passes. Generally, the value of the gradient threshold determines the percentage of z-buffer elements which are ray-cast at each pass and is thus a focus of a time/quality tradeoff. Preferably, these thresholds are determined by statistical analysis of the data set and/or by examining the partially filled z-buffer to determine statistical properties of the generated image. Alternatively or additionally, the ratio of increase in ray density may be different when passing between a first pass and a second pass and when passing between a second pass and a third pass.

Another aspect of some preferred embodiments of the invention is that it is possible to trade-off between time and quality, simply by stopping the ray-casting. Thus, real-time rendering can be performed, even if there is an occasional unexpected processing load on the computer performing the rendering. The ray-length finding method maintains an approximate location of an intersection from the time it first finds an intersection. The z-buffer generation method maintains a partially filled z-buffer at every instant. Further, when there is extra time available, the quality of the ray-casting can be increased by raycasting into z-buffer elements which were interpolated and/or determining more precise intersection locations for rays for which a less than maximal accuracy was previously determined. Preferably the z-buffer elements to be ray-cast are selected by changing the threshold of the gradient.

Figure 5:
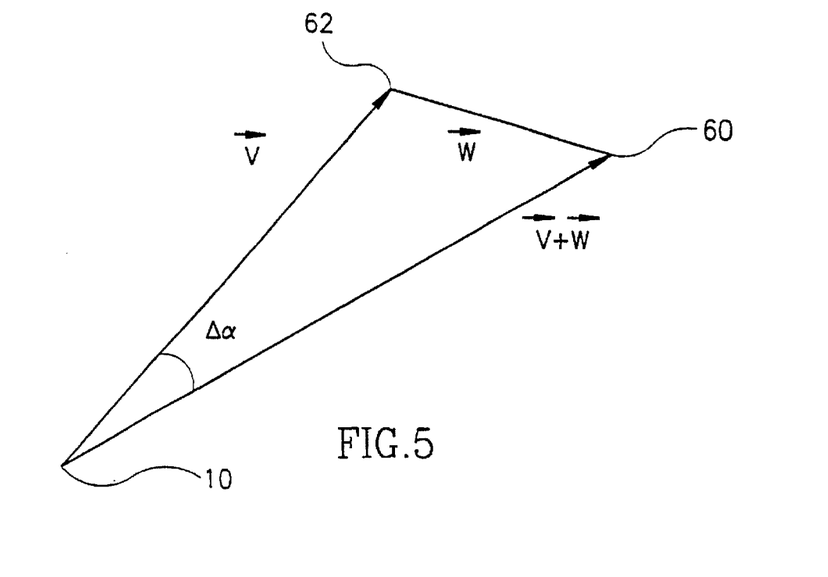
FIG. 5 is a diagram showing a method of determining a gradient, in accordance with a referred embodiment of the invention.

FIG. 5 is a diagram showing a method of determining a gradient between two z-buffer elements, in accordance with a preferred embodiment of the invention, in a perspective projection. $\vec{v}$ is a vector representing a ray cast to a z-buffer element 62. $\vec{w}$ is a vector representing an offset to a neighboring (but not necessarily contiguous) z-buffer element 60. Typically, $\|\vec{w}\| << \|\vec{v}\|$. The ray to z-buffer element 60 is the sum $\vec{v} + \vec{w}$. The angle between the two cast rays is, to a first order approximation:

$$\Delta \alpha = \frac{\|\vec{w}\|}{\|\vec{v}\|} \sqrt{1 - \left(\frac{\vec{w} \cdot \vec{v}}{\|\vec{w}\| \cdot \|\vec{v}\|}\right)^2}$$

By denoting the length of the two rays (to voxels 62 and 60) as $l_1$ and $l_2$, respectively, the gradient is $(l_1-l_2)/(\Delta\alpha * (l_1+l_2)/2)$.

If the projection used is an orthographic projection, assuming that $\vec{v}+\vec{w}$ and $\vec{v}$ are perpendicular to the projection plane, the gradient is $(l_1-l_2)/\|\vec{w}\|$.

Another aspect of some embodiments of the present invention relates to a method of interpolation which includes smoothing. Applying the smoothing interpolation generally requires the same number of steps as does a non-smoothing interpolation. Thus, if smoothing is required, a smoothing interpolation method is to be desired. In addition, the interpolation is based on four values $y_1$, $y_2$, $y_3$ and $y_4$ for four equidistant points (along a one dimensional line) denoted as $x_1$, $x_2$, $x_3$ and $x_4$. The point to be interpolated, x, is between $x_2$ and $x_3$. A cubic polynomial y(x) is chosen, so as to satisfy four constraints:

$$y(x_2) = \frac{y_1 + 2y_2 + y_3}{4} \quad (a)$$

$$y(x_3) = \frac{y_2 + 2y_3 + y_4}{4} \quad (b)$$

$$y'(x_2) = \frac{y_3 - y_1}{x_3 - x_1} \quad (c)$$

$$y'(x_3) = \frac{y_4 - y_2}{x_4 - x_2} \quad (d)$$

In this preferred embodiment of the invention, the smoothing is applied only by the first two constraints. However, in other preferred embodiments of the invention, smoothing may be applied by any number of the constraints, for example, all four constraints, only one constraint or any two constraints. Additionally or alternatively, a different amount and/or type of smoothing may be applied by different constraints. As a result, the interpolation may be asymmetric. It should also be appreciated that higher order interpolations may also include smoothing. However, for most uses cubic interpolation is considered sufficient. By way of example, other possible smoothing constraints include $y(x_2)=(y_1+y_2+y_3)/3$ and $y'(x_2)=((y_4+y_3+y_2)/3-y_1)/(x_3-x_1)$.

It should be appreciated that the values on which the interpolation is performed may be stored as packed bit values. As such, it is generally not practical to first smooth the bit data and then perform interpolations. By performing the smoothing as part of the interpolation, significant savings in memory and/or computational steps may be achieved.

When the interpolation is applied in more than one dimension, the dimensions are preferably collapsed. As long as the interpolation is linear in the interpolated values, the order by which the dimensions are collapsed is not important. In one example, where the interpolation is applied to a three-dimensional space, a 4×4×4 cube is collapsed into a 4×4 square, by the application of 16 interpolations. The 4×4 square is collapsed into a 4-length line, by the application of 4 interpolations and the line is interpolated once, to determine the desired value.

It should be appreciated that when the number of originating elements between which the interpolation is performed is not a power of four, other interpolation methods may be applied. For example, if a 2×4 array is interpolated, two of the above described interpolations may be applied, followed by a single averaging and/or linear interpolation. Alternatively, four linear interpolations may be applied, followed by a single of the above described cubic interpolations.

In a preferred embodiment of the invention, the interpolation is performed using a look up table. Such a table is especially efficient, with regard to storage space, in the first collapsing of dimensions, since only four bits are required to enumerate all the possibilities of the interpolated voxels. In general, when performing computationally intensive tasks, it is desirable to use look-up tables, rather than perform computations, if possible.

In a preferred embodiment of the invention, the smoothing interpolation is applied without unpacking the data. This is preferably achieved by performing the interpolation first in the direction in which the bits are packed (e.g., the x-direction). Thus, a group of voxels can be converted, using a look-up table, directly into a value representing the interpolated value (in one dimension). In one preferred embodiment of the invention, a group of four bits, corresponding to four voxels, are extracted from the packed data and matched against the lookup table, preferably as a four-bit value. Alternatively, the look-up table includes an index which represents the location of the relevant four bits in the packed data.

It should be appreciated that the above described methods of raycasting, as described hereinabove, contain many features, not all of which need be practiced in all embodiments of the invention. Rather, various embodiments of the invention will utilize only some of the above described techniques, features or methods and or combinations thereof. In addition, although the above description is focused on methods, apparatus for performing these methods is also considered to be within the scope of the invention.

It should also be appreciated that the above described methods are not generally limited by the shape of the voxels, for example, they may be applied to parallelepiped voxels.

In accordance with a preferred embodiment of the invention, some of the above methods are applied towards ray-tracing, for example for finding intersections and/or for interpolating color values. However, it should be appreciated that there may be a significant reduction in image quality, as compared to regular ray tracing, especially in determining specular reflections, since some of the above methods are suitable for low contrast areas separated by high contrast borders, while specular reflections are typically high contrast areas.

It will be appreciated by a person skilled in the art that the present invention is not limited by what has thus far been described. Rather, the present invention is limited only by the claims which follow.

What is claimed is:

1. A method of determining a z-buffer for a voxel data set, comprising:
    first raycasting at least a first ray to determine a value for a first z-buffer element, the value representing an intersection location between the first ray and a solid voxel of said data set; and
    second raycasting at least a second ray to determine a value for a second z-buffer element, the value representing an intersection location between the second ray and a solid voxel of said data set,
    wherein said z-buffer element values are determined at different accuracies by modifying the accuracy of determination of an intersection location for a single cast ray.

2. A method according to claim 1, wherein said different accuracies are responsive to characteristics of the data set at a neighborhood of said rays.

3. A method according to claim 1, wherein modifying the accuracy comprises using different interpolation methods to achieve different accuracies.

4. A method according to claim 1, wherein said intersection is determined by advancing along a ray and wherein modifying the accuracy comprises modifying a step size of said advance.

5. A method according to claim 1, wherein modifying said accuracy comprises modifying a granularity of said data set for performing said intersection determination.

6. A method according to claim 1, wherein said accuracy is determined responsive to a distance of said intersection from an origin of the ray.

7. A method according to claim 1, wherein said accuracy is determined responsive to a length of time for the intersection determination.

8. A method according to claim 1, wherein said at least first ray comprises a first plurality of rays.

9. A method according to claim 1, wherein said at least second ray comprises a second plurality of rays.

10. A method according to claim 1, comprising raycasting into the z-buffer at the vicinity of the first element and of the second element, with different ray densities, to provide different accuracies at said z-buffer elements.

11. A method according to claim 10, comprising determining a value of a characteristic at a z-buffer element and casting a ray at the z-buffer element only if the value is above a predetermined threshold.

12. A method according to claim 11, wherein said characteristic is a gradient.

13. A method according to claim 11, wherein said raycasting comprises first casting a first plurality of rays and said second raycasting comprises raycasting a second plurality of rays, wherein said second plurality of rays increases the density of rays cast into said z-buffer.

14. A method according to claim 13, wherein said second plurality of rays are cast between rays of said first plurality of rays.

15. A method according to claim 13, wherein the threshold value is dependent on the number of raycastings performed into the z-buffer.

16. A method according to claim 13, wherein said estimation uses an estimation method which is determined responsive to the number of raycastings performed into the z-buffer.

17. A method according to claim 1, comprising:
    determining said intersection of said first cast ray and said solid voxel at at least a second, higher accuracy, responsive to said first determined value.

18. A method according to claim 17, whererin said determining at a lower resolution comprises advancing along a ray in steps and performing a determination whether a current position is inside or outside a solid voxel.

19. A method according to claim 18, comprising determining a direction of advancing along a ray towards an intersection responsive to whether a current position along a ray is inside or outside a solid voxel.

20. A method according to claim 18, comprising retracing at least a portion of a step along the ray, between said determining at a lower accuracy level and determining at a higher accuracy level.

21. A method according to claim 17, comprising decreasing the accuracy of determination responsive to the amount of time spent at an accuracy level.

22. A method according to claim 17, wherein the accuracy is at least partially determined by a step size of advancing along a cast ray.

23. A method according to claim 17, wherein the accuracy is at least partially determined by a quality of the voxel data set.

24. A method according to claim 17, wherein the accuracy is at least partially determined by a quality of interpolation of a voxel value.

25. A method according to claim 1, wherein said data set is a medical data set.

26. A method of interpolation for rendering, comprising:
providing a data set representing voxel data for rendering; and
simultaneously smoothing and interpolating at least a part of said voxel data, by applying a smoothing interpolation to said data set;
rendering said data set using said smoothed and interpolated data set,
wherein said smoothing interpolation is defined using at least one constraint, and wherein said smoothing interpolation is characterized by not including a constraint that preserves a voxel center value.

27. A method according to claim 26, wherein the data set is a bit volume, in which each voxel is packed so as to be represented by less than a byte.

28. A method according to claim 27, wherein each voxel is represented by a single bit.

29. A method according to claim 27, wherein the voxels are not unpacked for said smoothing interpolation.

30. A method according to claim 25, wherein the interpolation is a cubic interpolation.

31. A method according to claim 25, wherein said interpolation requires an equal amount of steps as an interpolation which is of the same order but which does not perform smoothing.

32. A method according to claim 25, wherein said smoothing interpolation requires fewer steps than smoothing and applying an interpolation which is of the same order but which does not perform smoothing.

33. A method according to claim 25, wherein said interpolation uses at least two points which straddle a point to be interpolated and wherein said interpolation is not constrained to pass through at least one of the points which is adjacent said point to be interpolated.

34. A method according to claim 33, wherein said interpolation uses four points and wherein said interpolation is not constrained to pass through the two points which are adjacent to said point to be interpolated.

35. A method according to claim 25, wherein said at least one constraint comprises a plurality of constraints and comprising determining said smoothing interpolation, based on said plurality of constraints.

36. A method according to claim 35, wherein said plurality of constraints comprises at least one smoothing constraint.

37. A method according to claim 35, wherein said plurality of constraints comprises at least two smoothing constraints.

38. A method according to claim 37, wherein said at least two constraints comprise at least one constraint on a value of the interpolation.

39. A method according to claim 37, wherein said at least two constraints comprise at least one constraint on a derivative of said interpolation.

40. A method according to claim 35, wherein not all of said constraints utilize a same smoothing.

41. A method according to claim 40, wherein at least one of said constraints does not induce any smoothing.

42. A method according to claim 25, comprising utilizing said smoothed interpolated value to determine an intersection between a cast ray and a solid voxel.

43. A method according to claim 25, wherein the smoothing interpolation meets the following constraints, where $y_1$, $y_2$, $y_3$ and $y_4$ are values of points in the data set at points $x_1$, $x_2$, $x_3$ and $x_4$, respectively and where $x_1<x_2<x<x_3<x_4$:

$$y(x_2) = \frac{y_1 + 2y_2 + y_3}{4}$$
$$y(x_3) = \frac{y_2 + 2y_3 + y_4}{4}.$$

44. A method according to claim 25, wherein the smoothing interpolation meets the following constraints, where $y_1$, $y_2$, $y_3$ and $y_4$ are values of points in the data set at points $x_1$, $x_2$, $x_3$ and $x_4$, respectively and where $x_1<x_2<x<x_3<x_4$:

$$y'(x_2) = \frac{y_3 - y_1}{x_3 - x_1}$$
$$y'(x_3) = \frac{y_4 - y_2}{x_4 - x_2}$$

45. A method according to claim 25, wherein said smoothing interpolation generates an interpolated value 0.5 for runs of values . . . 0, 1, 0, 1, 0, 1, 0, 1 . . . , the value 0 for runs of zeros and the value 1 for runs of ones.

46. A method according to claim 25, wherein the derivative of the smoothing interpolation is continuous.

47. A method of determining a z-buffer value for a rendering of a voxel data set using a z-buffer, comprising:
adding a plurality of additional, non-image, solid voxels to said data set;
casting at least one ray to the voxel dataset, in the direction of at least one of said additional voxels;
determining an intersection between said ray and a solid voxel of said dataset;
determining if said solid voxel at said intersection is one of said additional voxels or a voxel of said voxel data set; and
updating said z-buffer with a value responsive to said determination of the voxel type.

48. A method according to claim 47, wherein said additional solid voxels enclose said voxel data set.

* * * * *

UNITED STATES PATENT AND TRADEMARK OFFICE
CERTIFICATE OF CORRECTION

PATENT NO. : 6,525,729 B1 Page 1 of 1
DATED : February 25, 2003
INVENTOR(S) : Shmuel Akerman et al.

It is certified that error appears in the above-identified patent and that said Letters Patent is hereby corrected as shown below:

<u>Title page,</u>
Item [56], References Cited, OTHER PUBLICATIONS, change "Function" to
-- Functions --.

Signed and Sealed this

Twenty-ninth Day of March, 2005

JON W. DUDAS
*Director of the United States Patent and Trademark Office*